US009338843B2

(12) United States Patent
Jain et al.

(10) Patent No.: US 9,338,843 B2
(45) Date of Patent: May 10, 2016

(54) HIGH POWER FACTOR, ELECTROLYTIC CAPACITOR-LESS DRIVER CIRCUIT FOR LIGHT-EMITTING DIODE LAMPS

(71) Applicants:Praveen K. Jain, Kingston (CA); John Lam, Kingston (CA)

(72) Inventors: Praveen K. Jain, Kingston (CA); John Lam, Kingston (CA)

( * ) Notice: Subject to any disclaimer, the term of this patent is extended or adjusted under 35 U.S.C. 154(b) by 0 days.

(21) Appl. No.: 14/219,692

(22) Filed: Mar. 19, 2014

(65) Prior Publication Data
US 2014/0285102 A1  Sep. 25, 2014

Related U.S. Application Data
(60) Provisional application No. 61/803,423, filed on Mar. 19, 2013.

(51) Int. Cl.
*H05B 33/08* (2006.01)
*H02M 1/42* (2007.01)
*H05B 41/282* (2006.01)

(52) U.S. Cl.
CPC .......... *H05B 33/0815* (2013.01); *H02M 1/4258* (2013.01); *H05B 41/282* (2013.01)

(58) Field of Classification Search
CPC ............. H05B 33/0815; H05B 41/282; H05B 41/2827; H05B 41/2828; H02M 1/4258
USPC ....................... 315/307, 200 R, 291
See application file for complete search history.

(56) References Cited

U.S. PATENT DOCUMENTS

| | | | | |
|---|---|---|---|---|
| 5,757,630 A | * | 5/1998 | Lesea | 363/39 |
| 2003/0146714 A1 | * | 8/2003 | Buonocunto | 315/247 |
| 2004/0264214 A1 | * | 12/2004 | Xu et al. | 363/16 |
| 2007/0263417 A1 | * | 11/2007 | Lin | H02M 1/34 363/21.12 |
| 2010/0148673 A1 | * | 6/2010 | Stewart et al. | 315/121 |
| 2011/0188270 A1 | * | 8/2011 | Schmid | H02M 1/4208 363/21.12 |
| 2011/0317450 A1 | * | 12/2011 | Cheng et al. | 363/20 |
| 2013/0119869 A1 | * | 5/2013 | Peng | 315/125 |
| 2013/0300310 A1 | * | 11/2013 | Hu | 315/239 |

FOREIGN PATENT DOCUMENTS

KR   100971291   *  7/2010  ............ H02M 3/28

* cited by examiner

*Primary Examiner* — Douglas W Owens
*Assistant Examiner* — Raymond R Chai
(74) *Attorney, Agent, or Firm* — Brion Raffoul

(57) ABSTRACT

A driver circuit for use with LED lamps. The driver circuit uses a rectifier, a power factor correction subcircuit, a voltage conversion subcircuit, and a semiconductor switch. The power factor correction subcircuit uses a film capacitor instead of an electrolytic capacitor. As well, the power factor correction subcircuit uses either an inductor or a transformer to shape the incoming current to a substantially sinusoidal waveform that is in phase with the input AC current. The semiconductor switch provides a high frequency pulsating triangular current at the output of the rectifier.

9 Claims, 14 Drawing Sheets

HIGH POWER FACTOR, ELECTROLYTIC CAPACITOR-LESS DRIVER CIRCUIT FOR LIGHT-EMITTING DIODE LAMPS

RELATED APPLICATIONS

This application is a non-provisional application which claims the benefit of U.S. Provisional Patent Application No. 61/803,423 filed Mar. 19, 2013.

TECHNICAL FIELD

The present invention relates to driver circuits for light emitting diodes. More specifically, the present invention relates to a high power factor electronic driver circuit for light-emitting diode (LED) lamps and which does not use electrolytic capacitors.

BACKGROUND OF THE INVENTION

Lighting is an essential part of every household. Since its invention, incandescent lamps have been illuminating homes around the globe. However, in the recent years, the incandescent lamp has lost some of its luster as energy conservation becomes a priority in our society. While incandescent lamps are able to provide excellent light quality and performance, they suffer from very low power efficiency. The power efficiency of an incandescent lamp can be as low as 10%, with the majority of the energy consumed by the lamp being dissipated as heat rather than visible light. The incandescent lamp's low power conversion efficiency prompted the development of alternative energy-saving lighting solutions such as high power lighting emitting diode (LED) lamps.

Unlike incandescent lamps, LED lamps do not use electric current to heat a filament to produce light. Rather, they use an electronic driver circuitry to produce light. The design of the driver circuit thus becomes crucial in determining the performance of LED lamps. Despite saving a significant amount of energy compared to incandescent lamps, because of the commercial electronic circuitry currently used, LED lighting products cannot truly replace incandescent lamps when it comes to performance. With respect to technical advantages, the incandescent lamp is able to achieve a very high input power factor from the AC main. A high power factor means that the reactive power drawn from the lamp is low and that the power conversion efficiency is high from the utility side to the lamp. To minimize the size and cost of LED lamps, commercial LED lamp driver designs do not include a power factor correction (PFC) function. As a result, the power factor achieved by current LED products is approximately 30% lower than that of the incandescent lamps. The input current drawn from the LED lamps then contains a significant amount of unwanted harmonics. The presence of these harmonics implies that part of the power is wasted in the form of reactive power when power is transferred from the utility to the lamp.

As mentioned earlier, the electronic driver circuit is the key component that determines the lamp's performance. For LED household lighting products, the driver circuit receives energy from the AC mains and uses this energy to drive the LED semiconductors to ultimately produce light. At present, within commercial LED lamps, there exists a mismatch between the lifespan of the circuit and that of the actual LED devices. LED devices typically have a much longer lifespan than their driver circuits because of the presence of electrolytic capacitors in the commercial circuits. This capacitor is used to provide constant DC (Direct Current) output current to power the LED. The electrolytic capacitor is unreliable and its lifetime is at least 3-4 times lower than that of a LED.

Based on the above, there is therefore a need for systems and circuits which avoid the shortcomings of the prior art and which mitigates if not overcomes the issues associated with the prior art.

SUMMARY OF INVENTION

The present invention provides a driver circuit for use with LED lamps. The driver circuit uses a rectifier, a power factor correction subcircuit, a voltage conversion subcircuit, and a semiconductor switch. The power factor correction subcircuit uses a film capacitor instead of an electrolytic capacitor. As well, the power factor correction subcircuit uses either an inductor or a transformer to shape the incoming current to a substantially sinusoidal waveform that is in phase with the input AC current. The semiconductor switch provides a high frequency pulsating triangular current at the output of the rectifier.

A single switch electrolytic capacitor-less driver circuit with power factor correction for LED lamp is disclosed. In one embodiment, the invention provides a high power factor single-switch driver circuit for a LED lamp, the circuit comprising: an input rectifier for converting the AC input voltage to a rectified voltage; a power factor correction subcircuit for shaping the input line current to substantially a sinusoidal waveform and in phase with the input AC voltage, and for storing and transferring energy in the energy storage circuit; and a soft-switched step-down voltage conversion subcircuit for providing constant DC current to drive the output LED devices.

The driver circuit includes a semiconductor switch whose function of the switch is to provide a high frequency pulsating triangular current at the output of the rectifier. At this output of the rectifier, the average current is substantially sinusoidal and in phase with the rectified voltage.

The power factor conversion subcircuit has an energy storage portion which consists of a tapped inductor (L1) and an energy storage capacitor (C1). The function of the tapped inductor is to: store energy when the switch is on and to discharge its stored energy to the energy storage capacitor when the switch is off, and to provide soft-switching at the turn-on of the switch to minimize turn-on switching losses. The energy storage capacitor is placed between the input of the step-down voltage conversion circuit and the output of one side of the tapped inductor. This topology provides the following particular features: (1) unlike conventional topologies where the energy storage capacitor is placed directly across the LED devices, the energy storage capacitor is placed across the high input impedance of the step-down voltage conversion circuit; (2) the voltage ripple across the energy storage capacitor for the same capacitance is much less than that in the conventional designs.

By reducing the capacitance needed for the energy storage capacitor (C1), the conventionally used electrolytic capacitor can be replaced by a small size film capacitor in this topology, enhancing the overall reliability and lifetime of the LED lamp.

In a first aspect, the present invention provides a circuit for use in driving at least one light emitting diode (LED), the circuit comprising:
   an input rectifier for receiving an input AC signal;
   a power factor correction subcircuit for receiving an output of said rectifier and for shaping said output of said rectifier into a sinusoidal waveform;

a voltage conversion subcircuit for receiving an output of said power factor correction subcircuit and for providing a constant DC current to said at least one LED; and a semiconductor switch for providing a high frequency pulsating triangular current at an output of said rectifier;

wherein said power factor correction subcircuit is coupled between said rectifier and said voltage conversion subcircuit and ground;

said semiconductor switch is coupled between ground and one of said voltage conversion subcircuit or said power factor correction subcircuit.

In a second aspect, the present invention provides a circuit for use in driving at least one light emitting diode (LED), the circuit comprising:

an input rectifier;

an LC filter circuit for receiving an input AC signal, said LC filter circuit being coupled between said rectifier and said input AC signal;

a power factor correction subcircuit for receiving an output of said rectifier and for shaping said output of said rectifier into a sinusoidal waveform;

a voltage conversion subcircuit for receiving an output of said power factor correction subcircuit and for providing a constant DC current to said at least one LED; and a semiconductor switch for providing a high frequency pulsating triangular current at an output of said rectifier;

wherein said power factor correction subcircuit is coupled between said rectifier and said voltage conversion subcircuit and ground;

said voltage conversion subcircuit comprises:
a first conversion diode;
a second conversion diode;
a first conversion capacitor;
a second conversion capacitor;
a conversion inductor;

wherein said first conversion diode is coupled between said power factor correction subcircuit and a first coupling node;

said first conversion capacitor is coupled between said first coupling node and a second coupling node;

said second conversion diode is coupled between said first coupling node and said second coupling node;

said conversion inductor is coupled between said first coupling node and a first output node;

said second conversion capacitor is coupled between said first output node and said second coupling node;

said LED is coupled between said first output node and said second coupling node;

said semiconductor switch is coupled between ground and one of said voltage conversion subcircuit or said power factor correction subcircuit.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
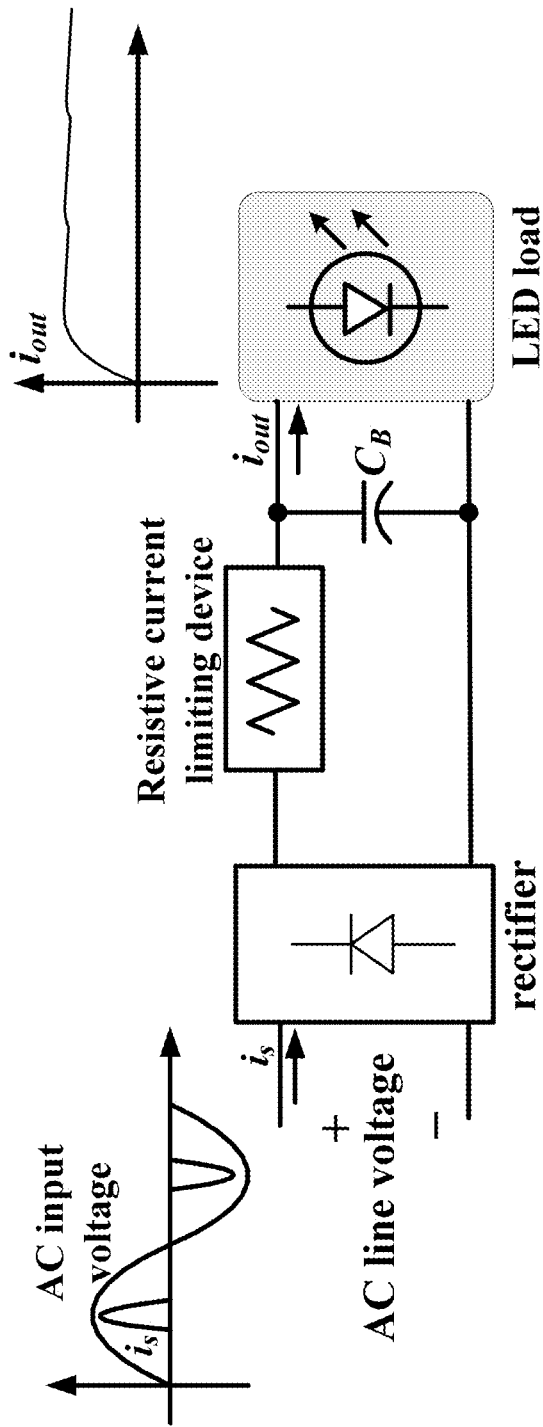
FIG. 1 illustrates a block diagram of an electronic driver circuit currently available in commercial LED lamps.

Referring to FIG. 1, a conventional driver circuit for LED lamps is illustrated. As can be scene, the circuit has a rectifier which receives the AC line voltage input. A resistive current limiting device is also present and a capacitor is present in parallel with the output of the circuit to the LED load. The output current rises until it reaches a steady and relatively constant value.

Figure 2A:
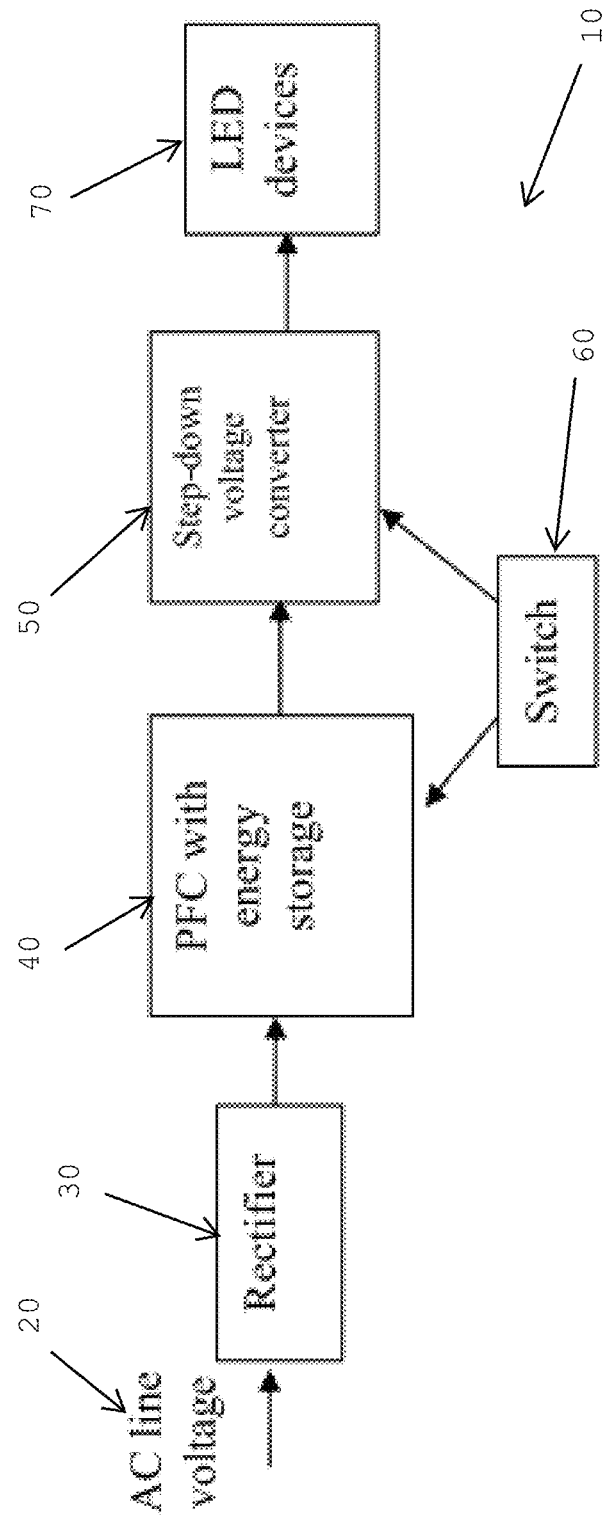
FIG. 2A is a high level block diagram of one embodiment of a dimmable, high power factor single switch drive circuit for light emitting diode lamps in accordance with one aspect the invention.

Referring to FIG. 2A, a block diagram of a circuit according to one aspect of the invention is illustrated. The circuit 10 has an input AC line voltage 20 which is received by a rectifier 30. The rectifier's output is received by a power factor correction (PFC) subcircuit 40 which also has an energy storage capacity. A step down voltage converter or voltage conversion subcircuit 50 receives the output of the PFC subcircuit 40. A switch 60 is coupled to both the PFC subcircuit 40 and voltage conversion subcircuit 50 to provide, when necessary, a path for current to follow.

Figure 2B:
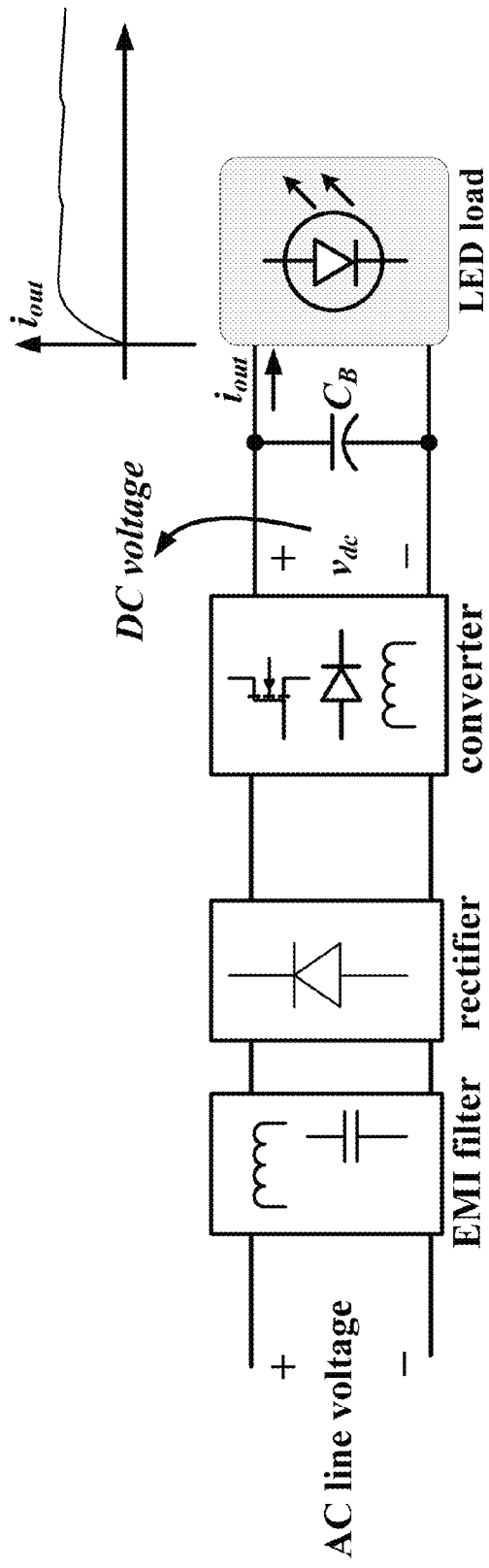
FIG. 2B illustrates a possible switch-mode power supply circuit for LED driver circuit.

Referring to FIG. 2B a circuit using a switch-mode power supply to provide constant current to an LED load is illustrated. As can be seen from the Figure, an EMI filter is placed between the AC line voltage and the rectifier. A converter is placed between the output capacitance ($C_B$). A power factor correction function may be carried out by the converter. However, this comes at a price as a large size output capacitance would be needed to provide the required DC output current. Specifically, a capacitance in the micro-Farad range would be needed to significantly reduce the low frequency (i.e. 100 Hz or 120 Hz) ripple which is imposed on the current output to the LED load. A film capacitor with a capacitance in this micro-Farad range would be too large and too expensive to be used in driver circuits to LED loads. Electrolytic capacitors would be more practical for such applications when using this circuit. Electrolytic capacitors have much higher energy density and would be more cost effective than similar film capacitors for the same amount of capacitance.

Figure 2C:
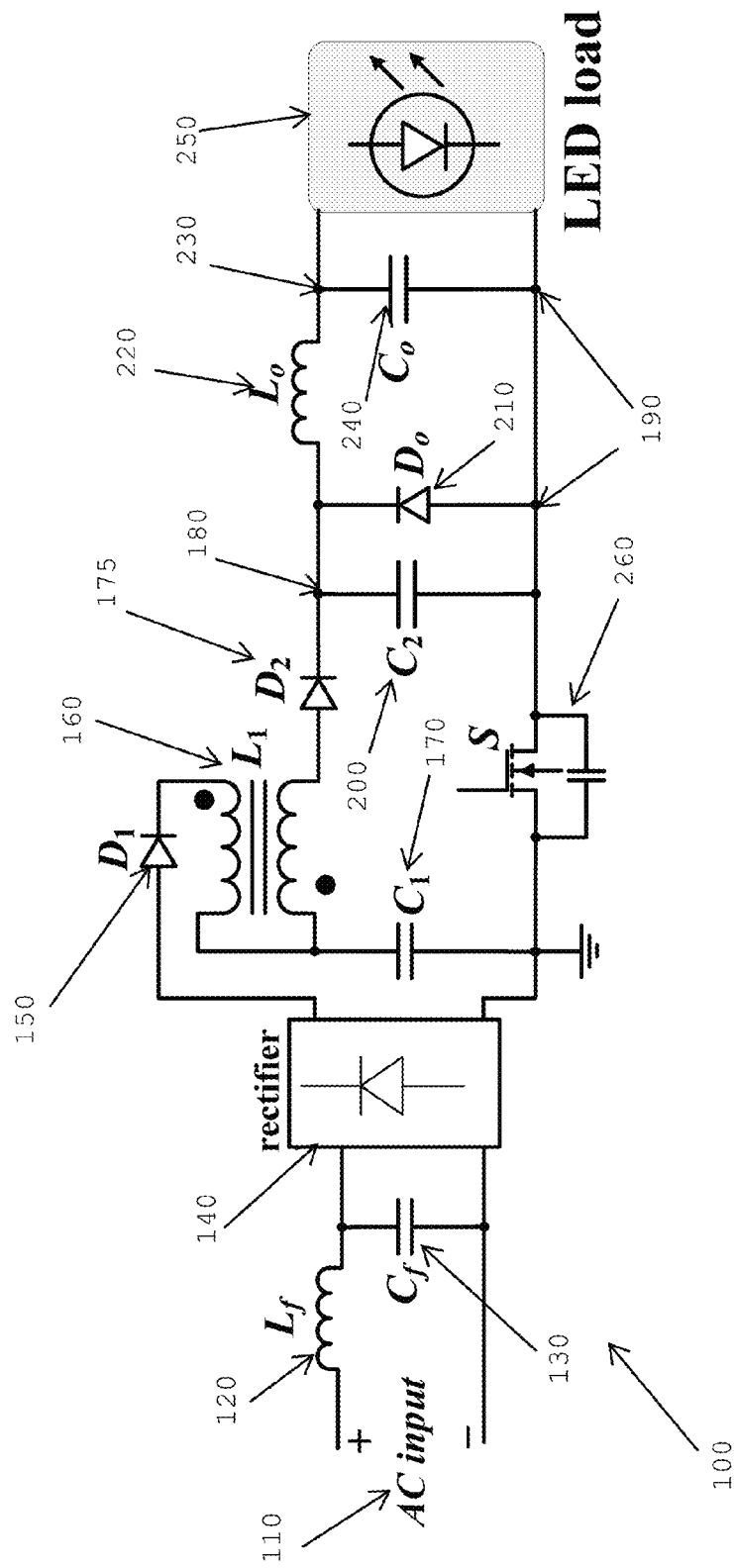
FIG. 2C is a detailed schematic diagram of one implementation of the circuit in FIG. 2A.

Referring to FIG. 2C, a driver circuit according to one aspect of the invention is illustrated. The circuit 100 has an AC input 110 which is received by an LC filter subcircuit with filter inductor 120 and filter capacitor 130. The LC filter is coupled to an input of a rectifier 140. One lead of the output of rectifier 140 is coupled to a PFC diode 150 while the other output lead of rectifier 140 is coupled to ground. The PFC diode 150 is coupled, in turn, to PFC inductor 160. A PFC capacitor 170 is coupled between one end of the PFC inductor 160 and ground. At another end of PFC inductor 160 is a first conversion diode 175. This first conversion diode 175 is coupled between the PFC inductor 160 and a first coupling node 180. Between the first coupling node 180 and a second coupling node 190 is a first conversion capacitor 200. Also coupled between the first coupling node 180 and second coupling node 190 is a second conversion diode 220. A conversion inductor 220 is coupled between the first coupling node 180 and a third coupling 230. Between the third coupling node 230 and the second coupling node 190 is a second conversion capacitor 240. The LED load 250 is coupled between the third coupling node 230 and the second coupling node 190.

It should be noted that a semiconductor switch 260 is coupled between the second coupling node 190 and ground.

The circuit as shown in FIG. 2C, has the components $D_o$, $L_o$, $C_o$ resemble the ordinary step-down (buck) converter. Instead of placing the energy storage capacitor ($C_1$) directly across the output LED devices, the circuit in FIG. 2C places this capacitor at the input of the step-down converter with a coupled-inductor $L_1$. This coupled-inductor performs power factor correction and stores its energy for discharge to the energy storage capacitor $C_1$. By reducing the required energy storage capacitance, a film capacitor can be used to replace the electrolytic capacitor as the energy storage element. Since the film capacitor is known to be much more reliable than the electrolytic capacitor in terms of its lifespan and performance, the elimination of the electrolytic capacitor in the driver circuit will allow for the full maximization of the potential lifespan of the LED lamp.

By operating the coupled-inductor $L_1$ in discontinuous conduction mode (DCM), the peak of the pulsating triangular current at the output of the rectifier follows the peak of the rectified AC voltage, allowing the average rectified current to approximately follow the sinusoidal voltage envelope. As a result, a high input power factor is achieved without the use of any feed-forward control circuit.

It should be noted that there are other advantages to the circuit in FIG. 2C. Specifically, the energy storage capacitance is significantly reduced as the circuit uses a coupled-inductor ($L_1$) as part of the energy storage element. As well, only film capacitors are preferably used in the circuit. Thus, capacitors $C_1$ (for energy storage), $C_2$ (for providing soft-switching), and $C_o$ (used together with Lo to minimize the high frequency rippled in the output current) can all be film capacitors. As noted above, the circuit provides a high power factor and the circuit also has a soft-switching capability by way of elements $L_1$ and $C_2$.

It should further be noted that the gate signal for the semiconductor switch "S" is derived from an external control logic unit. The control logic unit may have a PWM (pulse-width modulated) comparator with two inputs: a sawtooth triangular waveform with a frequency which equals the converter switching frequency, and a constant control signal. When the control signal is higher than the sawtooth signal, the comparator sends a gate signal to the semiconductor switch which turns on the switch and, otherwise, the switch is inactive or off. The turn-on duration of the switch is the duty cycle of the switch and this can be controlled by the magnitude of the constant control signal. An external integrated circuit (e.g. a single channel PWM control IC) may be used to generate the gate signal for the semiconductor switch from the sawtooth waveform.

Figure 3:
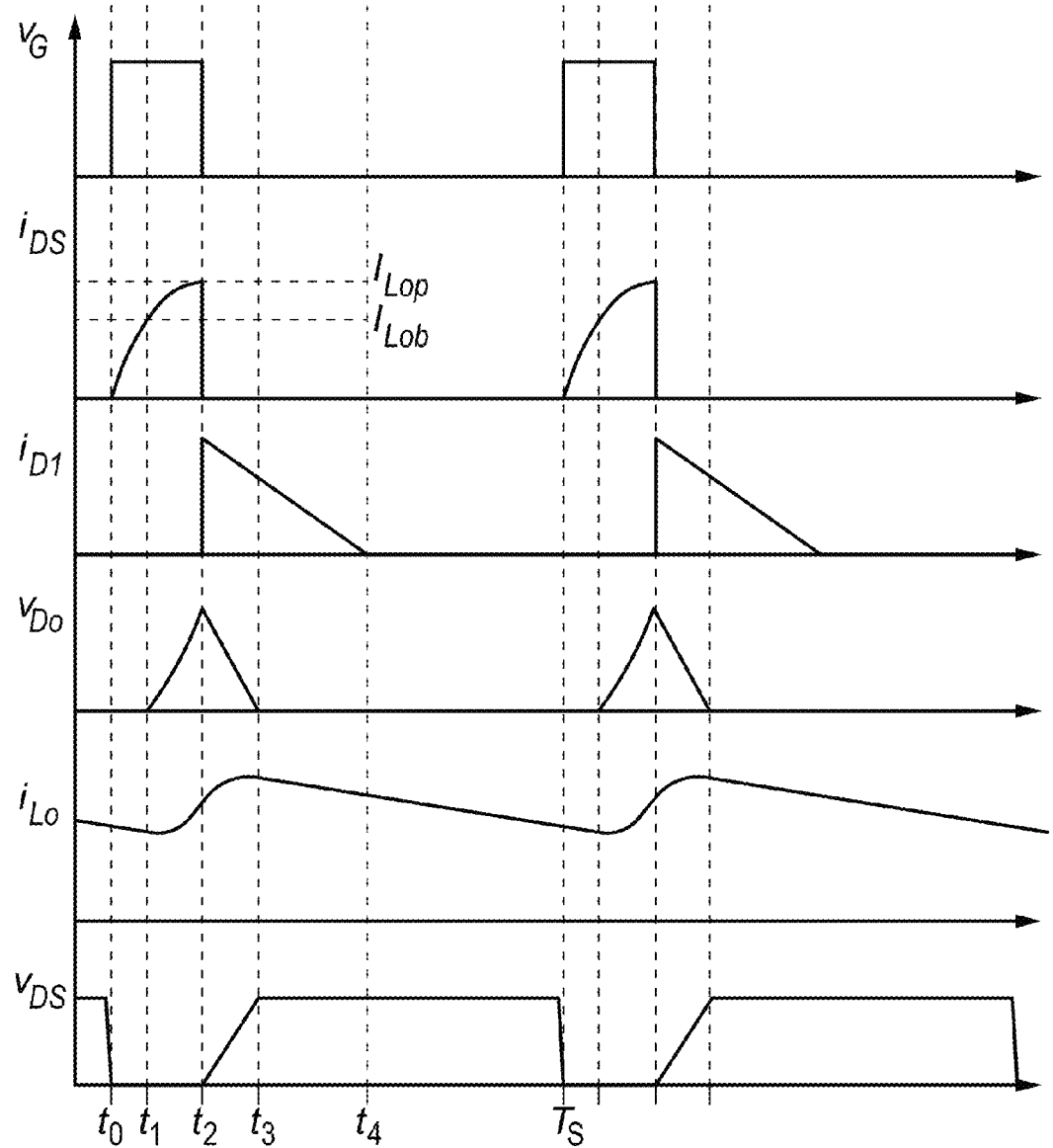
FIG. 3 illustrates the steady-state operating waveforms of the circuit of FIG. 2C.
Figure 4:
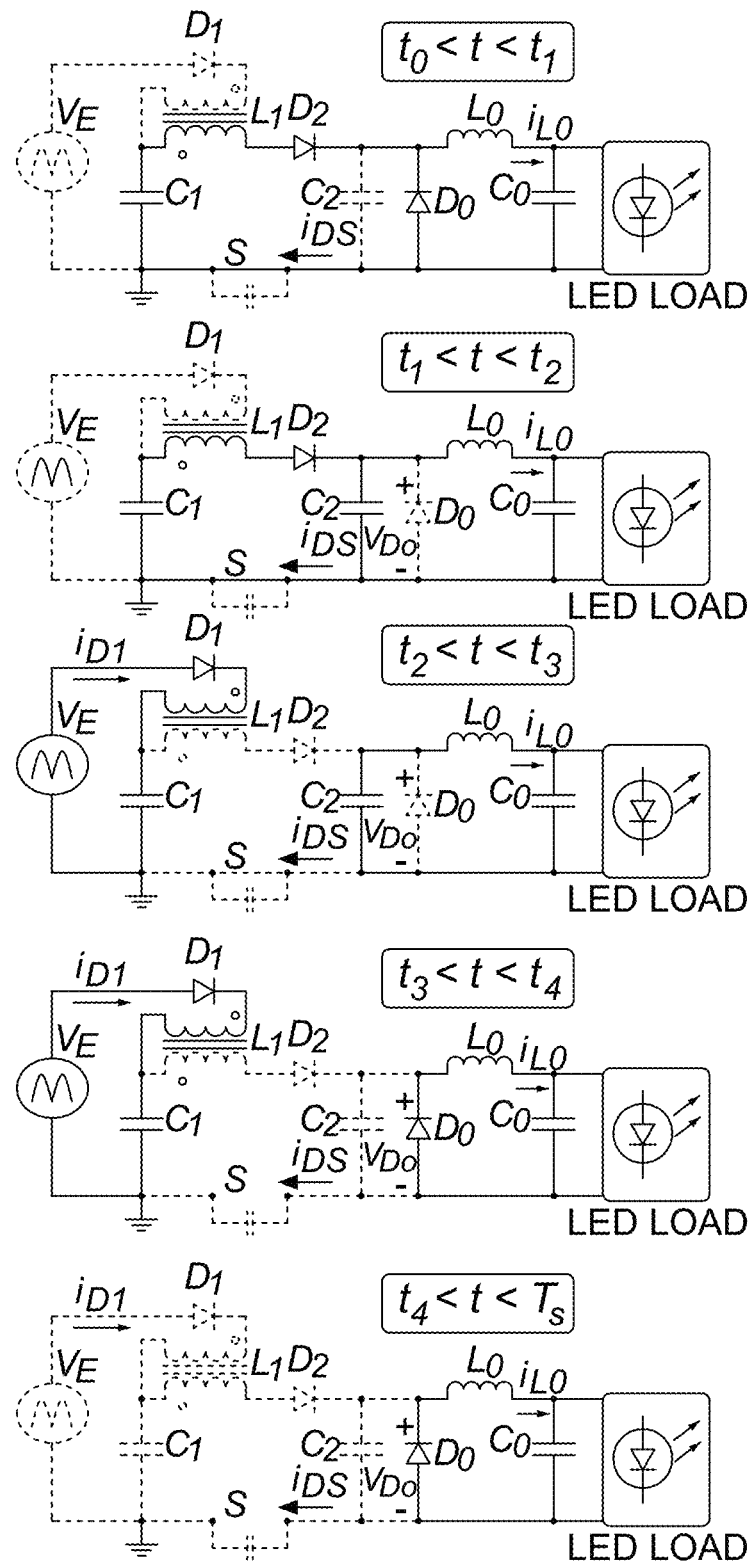
FIG. 4 illustrates the various operating stages of the circuit of FIG. 2C.

The detailed circuit operating principles and key operating waveforms for the circuit in FIG. 2C are discussed below with reference to FIG. 3 and FIG. 4 respectively.

Circuit Analysis

The operation of the driver circuit in FIG. 2C can be broken down into five stages as described below. For a better understanding of the circuit, FIG. 3 and FIG. 4 are provided. FIG. 3 illustrates the relevant waveforms on a common timeline. FIG. 4 illustrates which elements of the driver circuit are operational at the various stages. For ease of reference, the time frame for each stage is provided above the relevant circuit in FIG. 4.

Stage 1 ($t_0 \le t < t_1$): Since the switch (S) was off prior to $t = t_0$, the diode $D_o$ must have been on for $t < t_0$ to carry the output inductor current. At $t = t_0$, the gate signal ($v_G$) of the switch goes high, both S and $D_o$ are on. After S turns on, the voltage across the energy storage capacitor is applied to the coupled-inductor primary side, and the current of the coupled-inductor primary side (i.e. also the switch current) $i_{ds}$ starts to rise linearly until it reaches the output inductor current $I_{Lob}$.

Stage 2 ($t_1 \le t < t_2$): During this stage, the switch is still on. At $t_1$, $i_{ds}(t_1) = i_{Lo}(t_1)$, and diode $D_o$ turns off. The current of the coupled-inductor ($i_{ds}$) and output inductor current $i_{Lo}$ are equal to each other at $t_1$. After that, the magnitude of $i_{ds}$ becomes greater than $i_{Lo}$, which forces diode $D_o$ to be off. The difference between $i_{ds}$ and $i_{Lo}$ is now flowing through capacitor $C_2$. This stage ends when the gate signal of the switch goes low.

Stage 3 ($t_2 \le t < t_3$): At $t_2$, the gate signal goes low and the switch (S) turns off. Due to the reverse polarity of the coupled inductor, diode $D_1$ turns on, and the energy stored in $L_1$ now starts to discharge to the energy storage capacitor ($C_1$). The current flowing through $D_1$ then decreases linearly. At the same time, due to the presence of capacitor $C_2$, the voltage ($v_{ds}$) across the switch starts to increase until diode $D_o$ turns on again, which also indicates the end of this stage.

Stage 4 ($t_3 \le t < t_4$): During this stage, the switch (S) is still off, current $i_{D1}$ continues to decrease linearly until it drops to zero. Meanwhile, $v_{ds}$ has already reached its maximum value and stays constant throughout this stage.

Stage 5 ($t_4 \le t < T_S$): S is still off and $i_{D1}$ has already dropped to zero, which means $D_1$ is off during this stage. Meanwhile, $D_o$ is on and $i_{Lo}$ continues to flow through $D_o$, $L_o$, and the LED load.

With a large value of $L_o$, it is assumed that the average output current is: $i_{Loavg} = I_o$. The mathematical analysis of the topology in FIG. 2C is given below.

According to the voltage-second balance of the output inductor $L_o$, the relationship between the output voltage and the voltage across the output diode ($D_o$) is:

$$v_{Do} \cdot d_1 = V_o \quad (1)$$

where $V_{Do}$, is the rms value of the $v_{Do}$ and the output diode $D_o$ conduction time is $(1-d_1)$ where $$d_1 = \frac{t_2 - t_1}{T_S} \quad (2)$$

The output ripple current is given by $$\frac{V_{Do} - V_O}{L_O} \cdot d_1 \cdot T_S = \delta I_O \qquad (3)$$

where δ is the percentage of the output ripple current.

The peak values of the output currents are given by:

$$I_{Lob} = \left(1 - \frac{1}{2}\delta\right) I_O \qquad (4)$$

$$I_{Lop} = \left(1 + \frac{1}{2}\delta\right) I_O \qquad (5)$$

At $t=t_1$, the current of the coupled-inductor is equal to that of the output inductor $L_o$ which is given by $$\frac{V_{dc}}{L_1} \cdot d_2 \cdot T_S = I_O + \frac{1}{2}\delta I_O - \frac{V_O}{L_O} \cdot (1 - d_1) \cdot T_S \qquad (6)$$

$$d_2 = \frac{t_1 - t_0}{T_S} \qquad (7)$$

$$d = d_1 + d_2 \qquad (8)$$

Also, the voltage across the output diode $D_o$ is given by $$V_{Do} = \frac{(V_{dc} - V_O) \cdot L_O}{L_1 + L_O} + V_O \qquad (9)$$

According to the voltage-second balance of the coupled-inductor $L_1$, the equation is given by:

$$V_{dc} \cdot d_2 + (V_{dc} - V_{Do}) \cdot d_1 = (V_{dc} - V_E) \cdot N \cdot d_3 \qquad (10)$$

where N is the turns-ratio of the coupled-inductor and $d_3$ is the storage energy time of the coupled-inductor.

The relationship between the input and output power balance is given by $$\frac{V_O \cdot I_O}{\eta \cdot V_E} \cdot T_S = \frac{1}{2} \cdot \left(1 + \frac{1}{2}\delta\right) \cdot I_O \cdot d_3 \cdot T_S \qquad (11)$$

where η is the efficiency between the DC-link average power and lamp output power.

The coupled-inductor second side ripple current is given by $$\frac{V_{dc} - V_E}{L_1/N^2} \cdot d_3 \cdot T_S = N \cdot \left(1 + \frac{1}{2}\delta\right) \cdot I_O \qquad (12)$$

The coupled-inductor primary side ripple current is given by $$\frac{V_{dc}}{L_1} \cdot d_2 \cdot T_S + \frac{V_{dc} - V_{Do}}{L_1} \cdot d_1 \cdot T_S = \left(1 + \frac{1}{2}\delta\right) \cdot I_O \qquad (13)$$

where the coupled-inductor current increases time $d_2$.

From equation (11), the storage energy time of the coupled-inductor $d_s$ is derived as:

$$d_3 = \frac{t_3 - t_2}{T_S} = \frac{2V_O}{\eta V_E \left(1 + \frac{1}{2}\delta\right)} \qquad (14)$$

By placing Eqn. (1) into Eqn. (3), the output diode $D_o$ conduction time $d_1$ is obtained as $$d_1 = 1 - \frac{I_O L_O \delta}{V_O T_S} \qquad (15)$$

$V_{dc}$, $L_1$, and duty cycle d are calculated using (10), (12), and (13) respectively as follows:

$$V_{dc} = \frac{\delta N V_E d_s}{\delta N d_s - \left(1 + \frac{1}{2}\delta\right) d_1} \qquad (16)$$

$$L_1 = \frac{\delta N V_E d_3 d_1 T_S}{I_O \left[\delta N d_3 - \left(1 + \frac{1}{2}\delta\right) d_1\right]} - \frac{V_O T_S}{I_O \delta} \qquad (17)$$

$$d = \frac{V_O}{V_E} - \left(\frac{V_O}{V_E N d_3} + 1\right) \frac{\left(1 + \frac{1}{2}\delta\right) d_1}{\delta} \qquad (18)$$

From the above, then $d_2$ is given by $$d_2 = d - d_1 \qquad (19)$$

From Eqns. (14) and (17), the minimum value of the second side of coupled-inductor voltage is achieved:

$$V_{Tsmin} = L_1 \frac{\left(1 + \frac{1}{2}\delta\right) I_O}{d_3 T_S} \qquad (20)$$

Based on the above, the minimum value of the primary side of coupled-inductor voltage $V_{Tpmin}$ is determined to be:

$$V_{Tpmin} = N L_1 \frac{\left(1 + \frac{1}{2}\delta\right) I_O}{d_3 T_S} \qquad (21)$$

Based on this, the maximum voltage stress across the switch semiconductor is obtained as:

$$V_{DSmax} = V_{dc} - V_{Tpmin} - V_{D2max} \qquad (22)$$

where $V_{D2max}$ is the maximum voltage across the diode $D_2$ and is equal to $V_{Tpmin}$. $V_{dc}$ is given by (16).

$V_{DSmax}$ is therefore given by:

$$V_{DS\,max} = \frac{\delta N V_E d_s}{\delta N d_s - \left(1 + \frac{1}{2}\delta\right) d_1} - 2 N L_1 \frac{\left(1 + \frac{1}{2}\delta\right) I_O}{d_3 T_S} \qquad (23)$$

Figure 5:
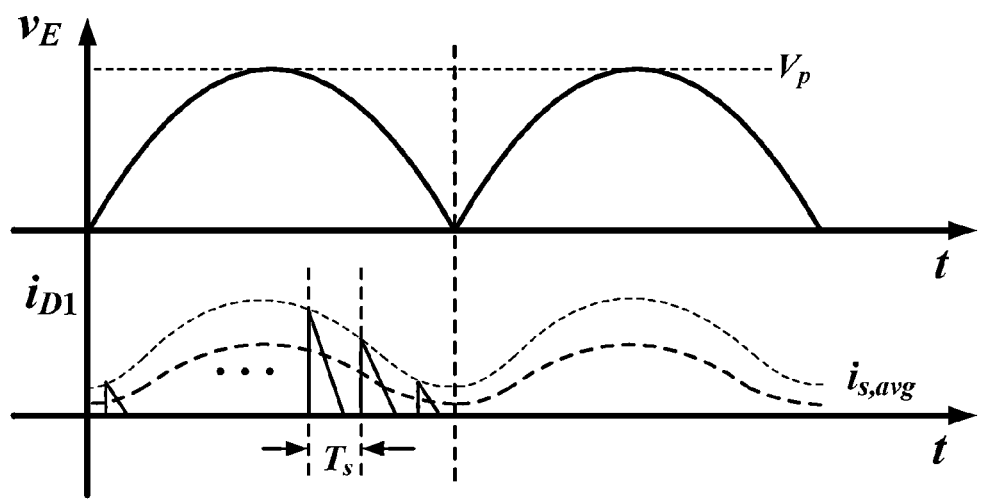
FIG. 5 illustrates the theoretical waveforms of the rectified voltage and current of the circuit of FIG. 2C.

The above analysis can be used to calculate and plot the rectified voltage and current of the circuit in FIG. 2C. FIG. 5 illustrates these theoretical results.

Performance and Evaluation

To verify the theoretical concept and the functionality of the LED driver topology, a prototype was built and tested in the laboratory. The specifications of the prototype are as follows:

Input voltage range: $V_{in,\,rms}$=85–120$V_{rms}$, 60 Hz;
Rated output power: $P_o$=7 W;
Switching frequency: $f_s$=55 kHz.

For the voltage converter, all design should be based on the line operation ($V_{in,\,rms}$=120$V_{rms}$). Following the above design guidelines, we obtain the converter parameters and selected components are listed in Table I below. It should be noted that these values and components are provided as an example and should not be taken as limiting the scope of the invention.

| Device | Value/Part # | Description |
| --- | --- | --- |
| $L_f$ | 6.8 mH | |
| $C_f$ | 22 nF | Film 250 $V_{DC}$ Radial |
| $D_1, D_2, D_o$ | MUR160 | Ultra fast-recovery 1 A, 600 V |
| Rectifier | DF04SA | Diode GPP 1 A, 400 V |
| $C_1$ | 6.8 µF | Film 250 V Radial |
| $L_1$ | 0.75 mH | EE13 core |
| $C_2$ | 2.7 nF | Film 630 V Radial |
| $L_o$ | 2 mH | SPT50L 100 V |
| $C_o$ | 0.68 µF | Film 100 $V_{DC}$ Radial |
| S | IRF840 | MOSFET N-CH 500 V, 8 A |

The LED lamp is composed of 6 series-connected CREE MX3SWT-A1-0000-0009E7 LEDs. Each LED has a nominal voltage of 10.7V at a rated current of 115 mA. The output inductor is selected to be 2 mH. The corresponding duty cycle is calculated to be 0.13 at 120$V_{rms}$ line input with the switching frequency designed at 55 kHz. Using Eqns. (14), (15) and (17), the coupled-inductor value is determined to be 0.75 mH with turns ratio N=1. With the presence of the $L_1$ inductor, the capacitance of $C_1$ can be significantly reduced. In this implementation, the energy storage capacitance is 6.8 µF. In this example, the control IC (Integrated Circuit) UC3844B is used to generate the PWM waveform to control the switch and generate the gate signal for the semiconductor switch.

Figure 6:
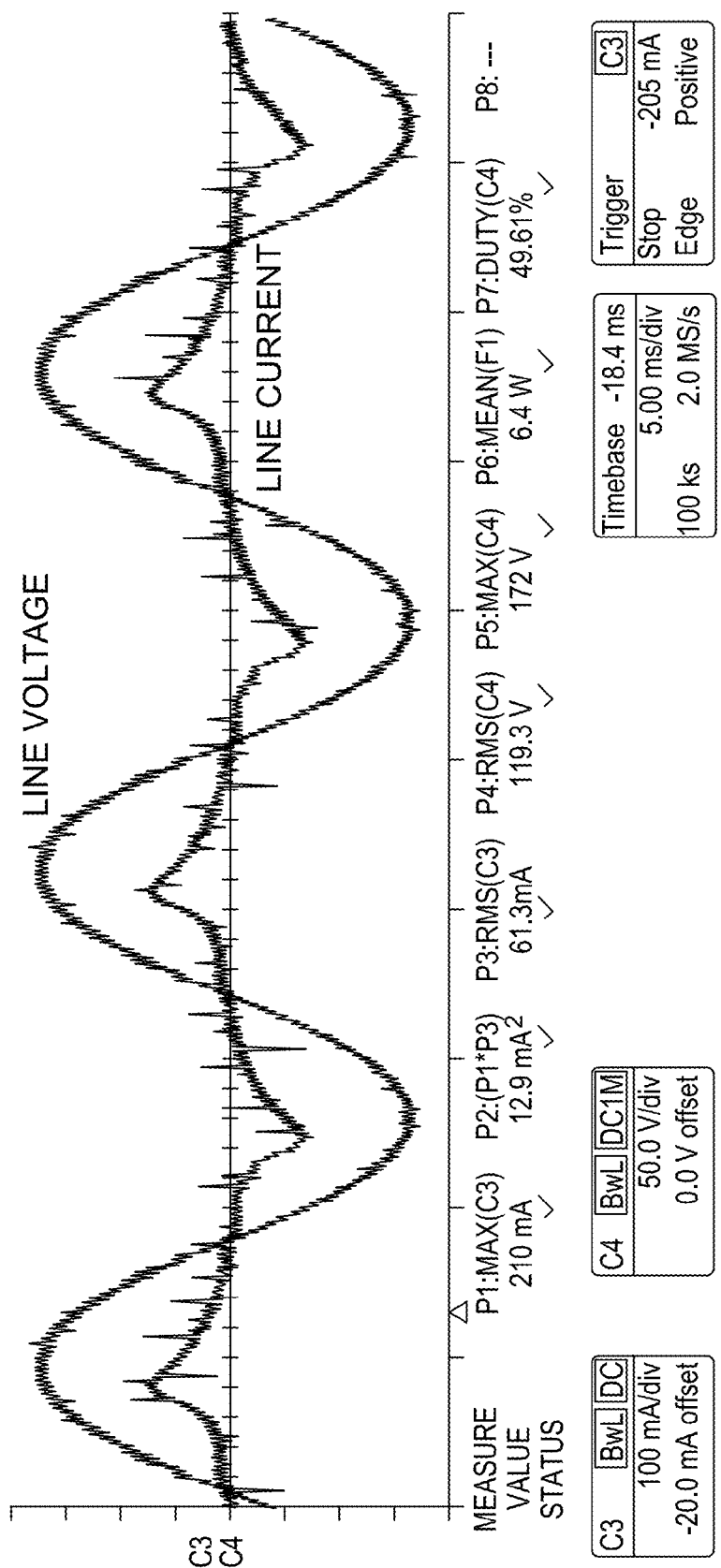
FIG. 6 shows the tested line voltage and line current of the circuit of FIG. 2C.
Figure 7:
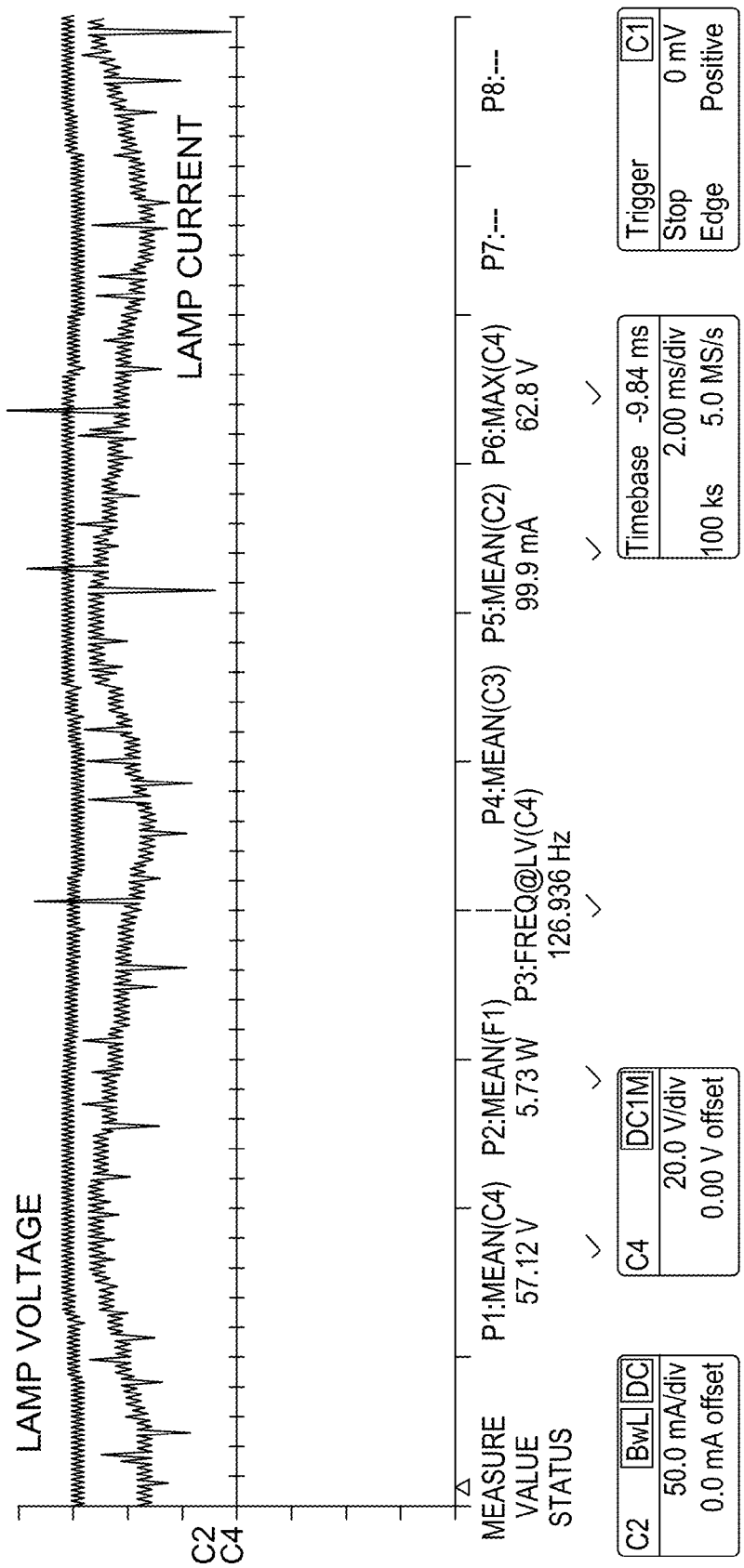
FIG. 7 shows the tested lamp voltage and lamp current of the circuit of FIG. 2C.
Figure 8:
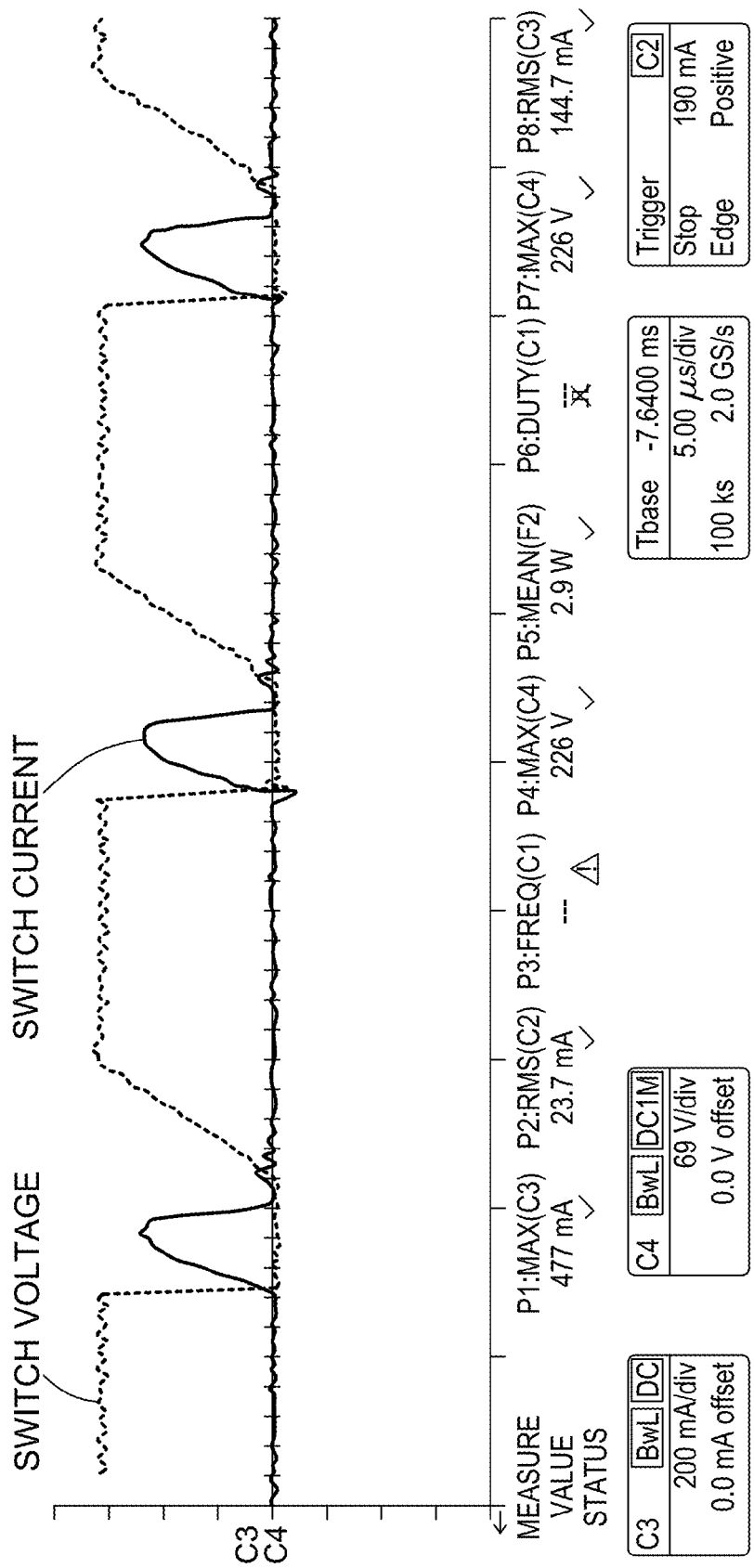
FIG. 8 shows the tested switch voltage and current of the circuit of FIG. 2C.
Figure 9:
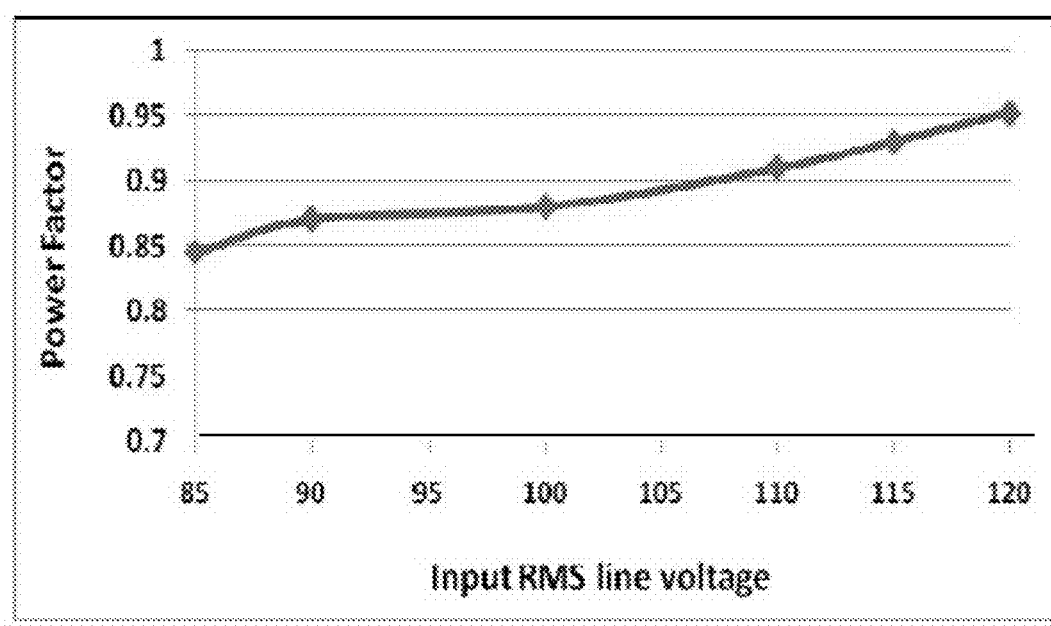
FIG. 9 shows the power factor performance for the circuit in FIG. 2C.
Figure 10:
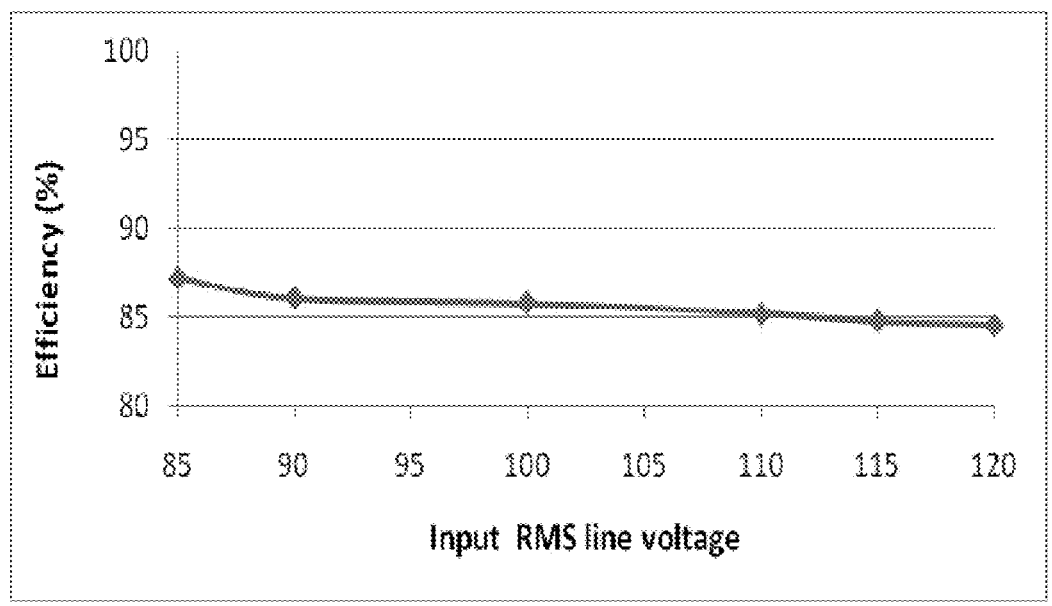
FIG. 10 shows the circuit efficiency performance of the circuit in FIG. 2C.
Figure 11:
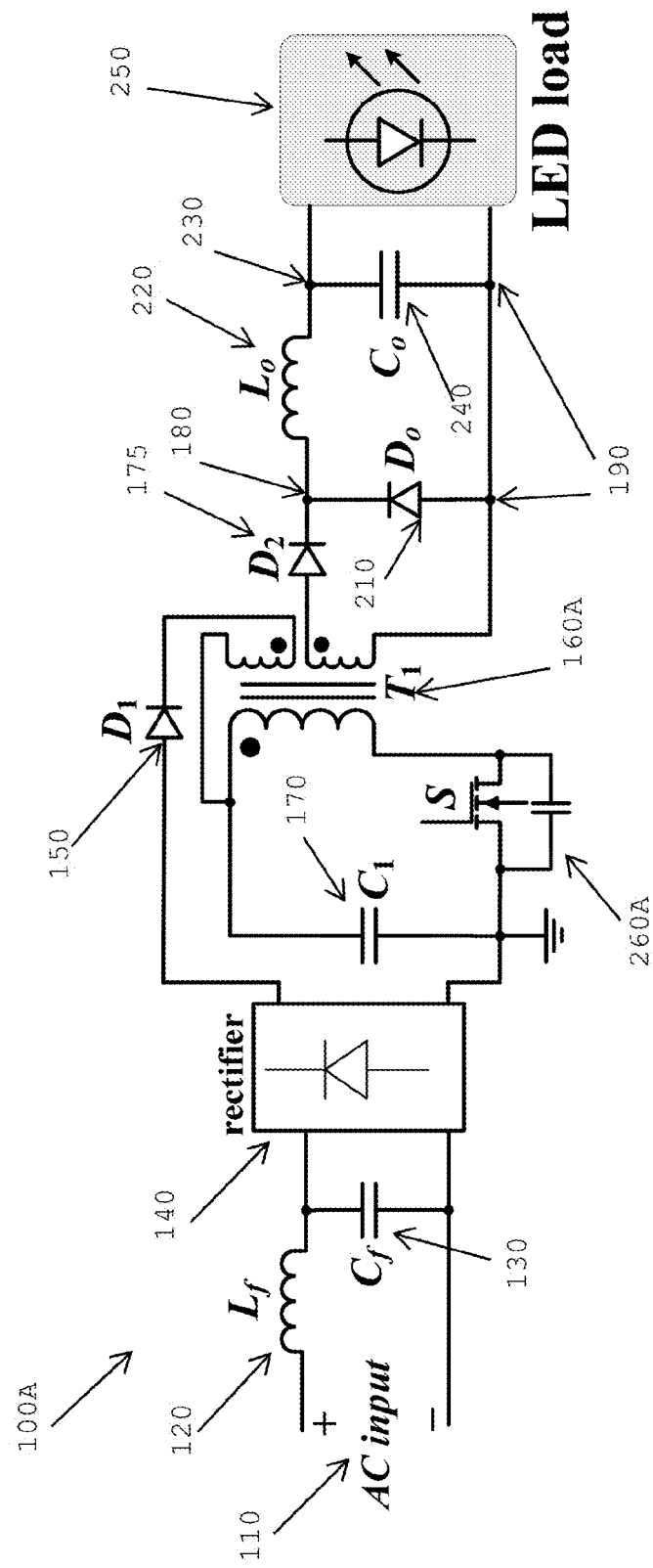
FIG. 11 is a schematic diagram of an alternative drive circuit for LED lamps according to another aspect of the invention.

FIGS. 6-8 show the experimental results of the topology in FIG. 2C. FIG. 6 shows the input voltage and input current at full power condition at 120$V_{rms}$ input. The output LED current and voltage waveforms are shown in FIG. 7. The current through the switch and its voltage waveform are shown in FIG. 8. The measured power factor and efficiency performance are shown in FIG. 9 and FIG. 10 respectively. At 120$V_{rms}$, the measured efficiency is 88%. FIG. 11 shows an alternative circuit configuration according to another aspect of the invention. In the circuit of FIG. 11, electrical isolation is provided by transformer ($T_1$). However, for the circuit in FIG. 11, a snubber circuit is required with the semiconductor switch to minimize the turn-off loss in the switch (S).

Referring to FIG. 11, the circuit 100A is an alternative to the circuit 100 in FIG. 2C. Since the two circuits are mostly similar, similar components will have similar reference numbers.

Referring to FIG. 11, a driver circuit 100A according to one aspect of the invention is illustrated. The circuit 100A has an AC input 110 which is received by an LC filter subcircuit with filter inductor 120 and filter capacitor 130. The LC filter is coupled to an input of a rectifier 140. One lead of the output of rectifier 140 is coupled to a PFC diode 150 while the other output lead of rectifier 140 is coupled to ground. The PFC diode 150 is coupled, in turn, to PFC transformer 160A. A PFC capacitor 170 is coupled between the PFC transformer 160A and ground. At another end of PFC transformer 160A is a first conversion diode 175. This first conversion diode 175 is coupled between the PFC transformer 160A and a first coupling node 180. Between the first coupling node 180 and a second coupling node 190 is a second conversion diode 220. The PFC transformer 160A is also coupled to the second coupling node 190. A conversion inductor 220 is coupled between the first coupling node 180 and a third coupling 230. Between the third coupling node 230 and the second coupling node 190 is a conversion capacitor 240. The LED load 250 is coupled between the third coupling node 230 and the second coupling node 190. The semiconductor switch 260 is coupled between the PFC transformer 160A and ground. It should be noted that the semiconductor switch 260 in FIG. 11 is equipped with a suitable snubber circuit.

Figure 12:
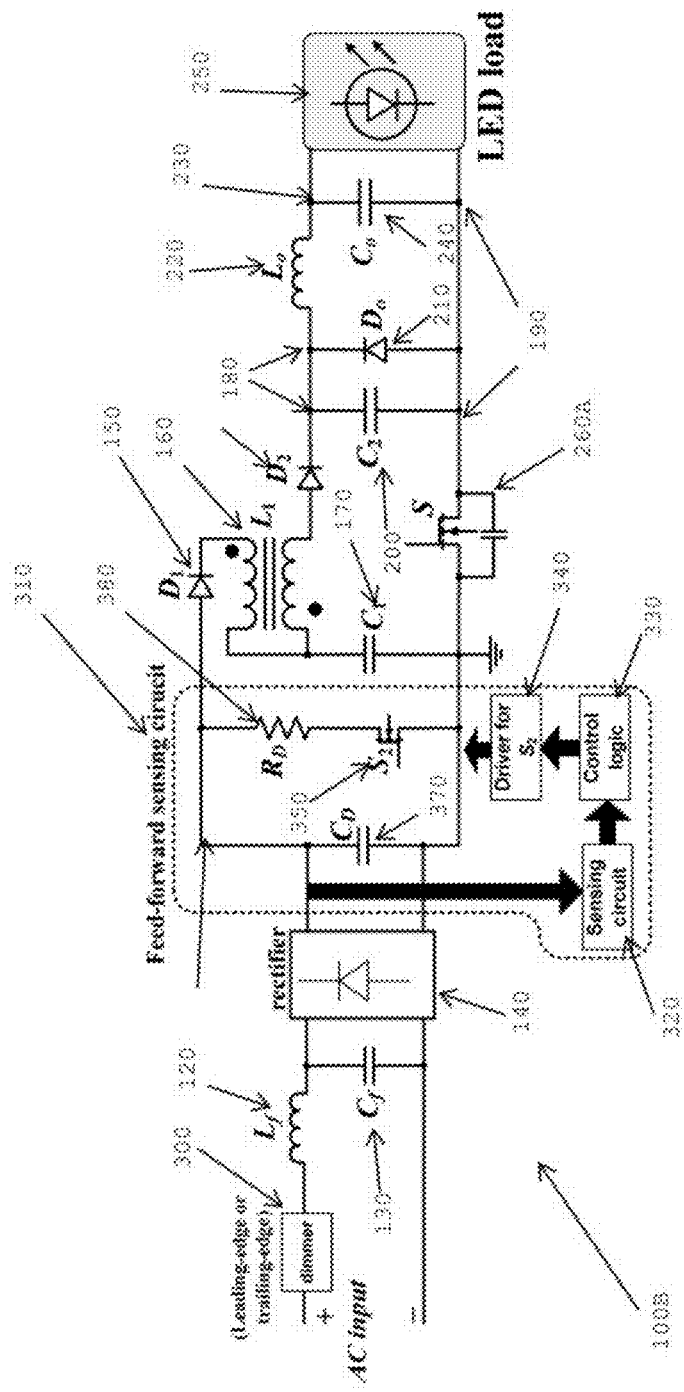
FIG. 12 is a variant of the circuit in FIG. 2C which incorporates a dimmer and a feed-forward sensing subcircuit according to another aspect of the invention.

Another alternative to the circuit in FIG. 2C is illustrated in FIG. 12. For the circuit in FIG. 2C, a dimming function can be implemented by adding extra circuitry. Dimming the LED devices can be achieved by adjusting the control angle of an external phase cut dimmer (such as a leading-edge or a trailing-edge phase cut dimmer). Referring to FIG. 12, the circuit 100B is an adjusted version of the circuit in FIG. 2C. As can be seen, a dimmer 300 is placed between the positive AC input and the filter inductor 120. A feed-forward sensing subcircuit 310 is placed between the rectifier 140 and the power factor correction subcircuit.

In FIG. 12, the feed-forward sensing subcircuit takes an output from the rectifier 140 and sends this to a sensing subcircuit 320. The output of this sensing subcircuit 320 is sent to a control logic 330. The output of the control logic 330 is sent to a driver subcircuit for a feed forward semiconductor switch 350.

The feed-forward sensing subcircuit 310 is coupled to the rectifier 140 by way of a common coupling node 360. Between the common coupling node 360 and ground is a feed-forward capacitor 370. Also coupled to the common coupling node 360 is a feed-forward resistor 380. Between the resistor 380 and ground is the feed forward semiconductor switch 350. The common coupling node is also coupled to the PFC diode 150. As can be imagined, elements common to FIG. 2C and FIG. 12 are referenced by the same reference numbers.

The operation of the dimming function is explained below. During dimming, the duty cycle of the main switch (S) remains constant, and the output DC current magnitude or amplitude is only reduced to lower the output lumens of the LEDs by adjusting the control angle of the phase cut dimmer. In order to maintain the holding current of the phase cut dimmer when it turns on, the feed-forward sensing subcircuit provides information about the rectified voltage.

During normal operation, the feed-forward sensing subcircuit is not activated, and the dummy resistor ($R_D$) is disconnected from the circuit. The parameters of the feed-forward sensing subcircuit are designed such that the feed-forward sensing subcircuit is only activated during very low dimming level. This ensures that the holding current of the dimmer is maintained while a high power efficiency is achieved at higher power conditions. When the feed-forward sensing subcircuit is activated, $S_2$ is on, and $R_D$ provides another current path to maintain the holding current of the phase cut dimmer.

It should be noted that the present invention may have multiple aspects and embodiments. Some of these aspects and embodiments may include a single switch high power factor electrolytic capacitor-less circuit for solid-state lighting. This circuit can comprise:

a diode rectifier for converting the AC input voltage to a full wave rectified voltage;
a power factor corrector that consists of a coupled inductor at the output of the diode rectifier that simultaneously performs the following function:
allowing a close to sinusoidal full wave average rectified current that is in phase with the full wave rectified voltage at the output of the diode rectifier;
discharging its stored energy to the energy storage capacitor when the main switch is off;
providing zero current switching turn on for the main switch;
a soft-switched voltage step-down converter that consists of an energy storage capacitor at its input to maintain a small low frequency ripple on the input voltage of the step-down converter and to provide constant DC current to the output load.

The single switch high power factor electrolytic capacitor-less driver circuit mentioned above may have a feature wherein the soft-switched operation of the main switch is provided by the coupled inductor and the parallel capacitor across the main switch.

Further to the above, for the single switch high power factor electrolytic capacitor-less driver circuit, the power factor corrector may operate in discontinuous conduction mode. As well, the duty cycle (turn-on duration) of the main switch for this circuit always remains constant. The light output of the driver circuit may be varied by using an external phase-cut incandescent lamp dimmer. The dimming function of the driver circuit may be achieved by adjusting the magnitude of the output DC current. A feed-forward control circuit may control the activation time of a parallel-connected dummy resistor during dimming with phase cut dimmers.

A person understanding this invention may now conceive of alternative structures and embodiments or variations of the above all of which are intended to fall within the scope of the invention as defined in the claims that follow.

We claim:

1. A circuit for use in driving at least one light emitting diode (LED), the circuit comprising:
    an input rectifier for receiving an input AC signal;
    a power factor correction (PFC) subcircuit for receiving an output of said rectifier and for shaping said output of said rectifier into a sinusoidal waveform;
    a voltage conversion subcircuit for receiving an output of said power factor correction subcircuit and for providing a constant DC current to said at least one LED; and
    a single semiconductor switch for providing a high frequency pulsating triangular current at an output of said rectifier; wherein
    said power factor correction subcircuit is coupled between said rectifier and said voltage conversion subcircuit and ground;
    said power factor correction subcircuit is devoid of other semiconductor switches other than said single semiconductor switch;
    said single semiconductor switch is coupled between ground and one of said voltage conversion subcircuit or said power factor correction subcircuit; and
    said power factor correction subcircuit comprises:
        a PFC coupled inductor; and
        a PFC diode; wherein
        said PFC diode is coupled between said input rectifier and said PFC coupled inductor; and
        said PFC coupled inductor is operated in a discontinuous conduction mode;
        said coupled inductor provides soft-switching when said single semiconductor switch is switched on
    wherein said voltage conversion subcircuit comprises:
        a first conversion diode;
        a second conversion diode;
        a first conversion capacitor;
        a second conversion capacitor;
        a conversion inductor; wherein
        said first conversion diode is coupled between said PFC subcircuit and a first coupling node;
        said first conversion capacitor is coupled between said first coupling node and a second coupling node;
        said second conversion diode is coupled between said first coupling node and said second coupling node;
        said conversion inductor is coupled between said first coupling node and a first output node;
        said second conversion capacitor is coupled between said first output node and said second coupling node;
        said LED is coupled between said first output node and said second coupling node; and said semiconductor switch is coupled between said second coupling node and ground.

2. A circuit according to claim 1, wherein said power factor correction subcircuit further comprises:
    an energy storage capacitor; and wherein
    said energy storage capacitor is coupled between said PFC coupled inductor and ground;
    said PFC coupled inductor is coupled to said voltage conversion subcircuit.

3. A circuit according to claim 2, wherein said energy storage capacitor is a film capacitor.

4. A circuit according to claim 1, further comprising a feed-forward sensing subcircuit for adjusting a magnitude of a DC current output to said LED, said feed-forward sensing subcircuit being coupled between said rectifier and said power factor conversion subcircuit.

5. A circuit according to claim 4, wherein said feed-forward sensing subcircuit comprises:
    a feed-forward sensing capacitor;
    a feed-forward sensing resistor;
    a feed-forward semiconductor switch; wherein
    said feed-forward sensing capacitor is coupled between ground and a common coupling node;
    said feed-forward sensing resistor is coupled between said common coupling node and said feed-forward semiconductor switch;
    said feed-forward semiconductor switch is coupled between said feed-forward sensing resistor and ground.

6. A circuit according to claim 5, further comprising an LC filter coupled between said rectifier and said input.

7. A circuit according to claim 6, further comprising a dimmer element between said input AC signal and said LC filter.

8. A circuit according to claim 1, further comprising an LC filter coupled between said rectifier and said input.

9. A circuit for use in driving at least one light emitting diode (LED), the circuit comprising:
    an input rectifier;
    an LC filter circuit for receiving an input AC signal, said LC filter circuit being coupled between said rectifier and said input AC signal;
    a power factor correction subcircuit for receiving an output of said rectifier and for shaping said output of said rectifier into a sinusoidal waveform;
    a voltage conversion subcircuit for receiving an output of said power factor correction subcircuit and for providing a constant DC current to said at least one LED; and a single semiconductor switch for providing a high frequency pulsating triangular current at an output of said rectifier; wherein said power factor correction subcircuit is devoid of other semiconductor switches other than said single semiconductor switch;

said power factor correction subcircuit is coupled between said rectifier and said voltage conversion subcircuit and ground;

said power factor correction subcircuit comprises:
 a PFC coupled inductor;
 an energy storage capacitor; and
 a PFC diode;
 wherein
 said PFC diode is coupled between said input rectifier and said PFC coupled inductor;
 said energy storage capacitor is coupled between said PFC coupled inductor and ground;
 said PFC coupled inductor is operated in a discontinuous conduction mode; said voltage conversion subcircuit comprises:
 a first conversion diode;
 a second conversion diode;
 a first conversion capacitor;
 a second conversion capacitor;
 a conversion inductor;
 wherein
 said first conversion diode is coupled between said power factor correction subcircuit and a first coupling node;
 said first conversion capacitor is coupled between said first coupling node and a second coupling node;
 said second conversion diode is coupled between said first coupling node and said second coupling node;
 said conversion inductor is coupled between said first coupling node and a first output node;
 said second conversion capacitor is coupled between said first output node and said second coupling node;
 said LED is coupled between said first output node and said second coupling node;

said semiconductor switch is coupled between ground and one of said voltage conversion subcircuit or said power factor correction subcircuit.

* * * * *